United States Patent
Uh et al.

(10) Patent No.: US 7,225,917 B2
(45) Date of Patent: Jun. 5, 2007

(54) CONVEYOR SYSTEM HAVING WIDTH ADJUSTMENT UNIT

(75) Inventors: Ji Heum Uh, Seoul (KR); Kyung Su Chae, Taegu-kwangyokshi (KR); Jeong Joon Lee, Kumi-shi (KR); Hyun Ho Song, Kumi-shi (KR); Hong Seok Lee, Kumi-shi (KR)

(73) Assignee: LG.Philips LCD Co., Ltd., Seoul (KR)

( * ) Notice: Subject to any disclaimer, the term of this patent is extended or adjusted under 35 U.S.C. 154(b) by 148 days.

(21) Appl. No.: 10/950,678

(22) Filed: Sep. 28, 2004

(65) Prior Publication Data

US 2005/0098412 A1    May 12, 2005

Related U.S. Application Data

(63) Continuation-in-part of application No. 10/303,922, filed on Nov. 26, 2002, now abandoned.

(30) Foreign Application Priority Data

Jun. 15, 2002  (KR) ............................... 2002-33500
Sep. 30, 2003  (KR) ..................... 10-2003-0067827

(51) Int. Cl.
   *B65G 39/18*    (2006.01)
(52) U.S. Cl. ................................. 198/836.3; 198/817
(58) Field of Classification Search ............... 198/817, 198/836.1, 836.2, 836.3
See application file for complete search history.

(56) References Cited

U.S. PATENT DOCUMENTS

| 3,978,580 | A | | 9/1976 | Leupp et al. |
| 4,094,058 | A | | 6/1978 | Yasutake et al. |
| 4,217,977 | A | * | 8/1980 | Tam ............................ 198/817 |
| 4,631,812 | A | * | 12/1986 | Young ......................... 198/817 |
| 4,653,864 | A | | 3/1987 | Baron et al. |
| 4,691,995 | A | | 9/1987 | Yamazaki et al. |
| 4,754,867 | A | * | 7/1988 | De Anda ..................... 198/817 |
| 4,775,225 | A | | 10/1988 | Tsuboyama et al. |
| 4,780,040 | A | * | 10/1988 | Petersen ...................... 198/817 |
| 5,247,377 | A | | 9/1993 | Omeis et al. |
| 5,263,888 | A | | 11/1993 | Ishihara et al. |
| 5,379,139 | A | | 1/1995 | Sato et al. |
| 5,406,989 | A | | 4/1995 | Abe |
| 5,499,128 | A | | 3/1996 | Hasegawa et al. |
| 5,507,323 | A | | 4/1996 | Abe |

(Continued)

FOREIGN PATENT DOCUMENTS

EP    1 003 066 A1    5/2000

(Continued)

*Primary Examiner*—James R. Bidwell
(74) *Attorney, Agent, or Firm*—McKenna Long & Aldridge LLP

(57) ABSTRACT

A conveyor system is disclosed, having a width adjustment unit capable of adjusting a width according to the size of goods to transfer semiprocessed goods in the process line, which includes a transfer unit for transferring goods; conveyor plates provided at both sides of the transfer unit, and guiding the goods by supporting both sides of the goods; and the width adjustment unit including a wire connected with the conveyor plates, a driving pulley operating the wire, and a driven connected with the wire.

40 Claims, 10 Drawing Sheets

U.S. PATENT DOCUMENTS

| | | | |
|---|---|---|---|
| 5,511,591 A | 4/1996 | Abe | |
| 5,539,545 A | 7/1996 | Shimizu et al. | |
| 5,548,429 A | 8/1996 | Tsujita | |
| 5,642,214 A | 6/1997 | Ishii et al. | |
| 5,657,856 A * | 8/1997 | von Froreich | 198/817 |
| 5,680,189 A | 10/1997 | Shimizu et al. | |
| 5,742,370 A | 4/1998 | Kim et al. | |
| 5,757,451 A | 5/1998 | Miyazaki et al. | |
| 5,852,484 A | 12/1998 | Inoue et al. | |
| 5,854,664 A | 12/1998 | Inoue et al. | |
| 5,861,932 A | 1/1999 | Inata et al. | |
| 5,875,922 A | 3/1999 | Chastine et al. | |
| 5,952,676 A | 9/1999 | Sato | |
| 5,952,678 A | 9/1999 | Ashida | |
| 5,956,112 A | 9/1999 | Fujimori et al. | |
| 6,001,203 A | 12/1999 | Yamada et al. | |
| 6,011,609 A | 1/2000 | Kato et al. | |
| 6,012,568 A * | 1/2000 | Kane | 198/817 |
| 6,016,178 A | 1/2000 | Kataoka et al. | |
| 6,016,181 A | 1/2000 | Shimada | |
| 6,055,035 A | 4/2000 | von Gutfeld et al. | |
| 6,142,293 A * | 11/2000 | Ozawa et al. | 198/817 |
| 6,163,357 A | 12/2000 | Nakamura | |
| 6,219,126 B1 | 4/2001 | von Gutfeld | |
| 6,226,067 B1 | 5/2001 | Nishiguchi et al. | |
| 6,236,445 B1 | 5/2001 | Foschaar et al. | |
| 6,304,306 B1 | 10/2001 | Shiomi et al. | |
| 6,304,311 B1 | 10/2001 | Egami et al. | |
| 6,337,730 B1 | 1/2002 | Ozaki et al. | |
| 6,378,198 B1 * | 4/2002 | Asai et al. | 198/817 |
| 6,414,733 B1 | 7/2002 | Ishikawa et al. | |
| 6,688,458 B2 * | 2/2004 | Prentice et al. | 198/817 |
| 2001/0002100 A1 | 5/2001 | Compton et al. | |
| 2002/0070102 A1 * | 6/2002 | Kawida et al. | 198/817 |

FOREIGN PATENT DOCUMENTS

| | | |
|---|---|---|
| EP | 1003066 | 5/2000 |
| JP | 51-65656 | 6/1976 |
| JP | 51065656 | 6/1976 |
| JP | 57-038414 | 3/1982 |
| JP | 57038414 | 3/1982 |
| JP | 57-088428 | 6/1982 |
| JP | 57088428 | 6/1982 |
| JP | 58-027126 | 2/1983 |
| JP | 58027126 | 2/1983 |
| JP | 59-057221 | 4/1984 |
| JP | 59057221 | 4/1984 |
| JP | 59-195222 | 11/1984 |
| JP | 59195222 | 11/1984 |
| JP | 60-111221 | 6/1985 |
| JP | 60111221 | 6/1985 |
| JP | 60-164723 | 8/1985 |
| JP | 60164723 | 8/1985 |
| JP | 60-217343 | 10/1985 |
| JP | 60217343 | 10/1985 |
| JP | 61-007822 | 1/1986 |
| JP | 61007822 | 1/1986 |
| JP | 61-055625 | 3/1986 |
| JP | 61055625 | 3/1986 |
| JP | S62-054225 | 3/1987 |
| JP | S62-054228 | 3/1987 |
| JP | 62-089025 | 4/1987 |
| JP | 62-090622 | 4/1987 |
| JP | 62089025 | 4/1987 |
| JP | 62090622 | 4/1987 |
| JP | 62-205319 | 9/1987 |
| JP | 62205319 | 9/1987 |
| JP | 63-109413 | 5/1988 |
| JP | 63-110425 | 5/1988 |
| JP | 63-128315 | 5/1988 |
| JP | 63109413 | 5/1988 |
| JP | 63110425 | 5/1988 |
| JP | 63128315 | 5/1988 |
| JP | 63-311233 | 12/1988 |
| JP | 63311233 | 12/1988 |
| JP | H03-009549 | 1/1991 |
| JP | H05-036425 | 2/1993 |
| JP | H05-036426 | 2/1993 |
| JP | H05-107533 | 4/1993 |
| JP | 05-127179 | 5/1993 |
| JP | 05127179 | 5/1993 |
| JP | 05-154923 | 6/1993 |
| JP | 5154923 | 6/1993 |
| JP | 05-265011 | 10/1993 |
| JP | 05-281557 | 10/1993 |
| JP | 05-281562 | 10/1993 |
| JP | 05265011 | 10/1993 |
| JP | 05281557 | 10/1993 |
| JP | 05281562 | 10/1993 |
| JP | 06-006089 | 1/1994 |
| JP | H06-018829 | 1/1994 |
| JP | 06-051256 | 2/1994 |
| JP | 06051256 | 2/1994 |
| JP | H06-064229 | 3/1994 |
| JP | 06-148657 | 5/1994 |
| JP | 06148657 | 5/1994 |
| JP | 06-160871 | 6/1994 |
| JP | 6160871 | 6/1994 |
| JP | H06-194637 | 7/1994 |
| JP | 06-235925 | 8/1994 |
| JP | 6235925 | 8/1994 |
| JP | 06-265915 | 9/1994 |
| JP | 06265915 | 9/1994 |
| JP | 06-313870 | 11/1994 |
| JP | 6313870 | 11/1994 |
| JP | 07-084268 | 3/1995 |
| JP | 7084268 | 3/1995 |
| JP | 07-128674 | 5/1995 |
| JP | 07128674 | 5/1995 |
| JP | 07-181507 | 7/1995 |
| JP | 08-095066 | 7/1995 |
| JP | 07181507 | 7/1995 |
| JP | H07-275770 | 10/1995 |
| JP | H07-275771 | 10/1995 |
| JP | H08-076133 | 3/1996 |
| JP | 08-101395 | 4/1996 |
| JP | 08-106101 | 4/1996 |
| JP | 08095066 | 4/1996 |
| JP | 8101395 | 4/1996 |
| JP | 08106101 | 4/1996 |
| JP | H08-110504 | 4/1996 |
| JP | H08-136937 | 5/1996 |
| JP | 08-171094 | 7/1996 |
| JP | 08-190099 | 7/1996 |
| JP | 08171094 | 7/1996 |
| JP | 08190099 | 7/1996 |
| JP | H08-173874 | 7/1996 |
| JP | 08-240807 | 9/1996 |
| JP | 08240807 | 9/1996 |
| JP | 09-005762 | 1/1997 |
| JP | 09-026578 | 1/1997 |
| JP | 09005762 | 1/1997 |
| JP | 09026578 | 1/1997 |
| JP | H09-001026 | 1/1997 |
| JP | 09-311340 | 2/1997 |
| JP | 09-61829 | 3/1997 |
| JP | 09-073075 | 3/1997 |
| JP | 09-073096 | 3/1997 |
| JP | 9061829 | 3/1997 |
| JP | 09073075 | 3/1997 |
| JP | 09073096 | 3/1997 |
| JP | H09-094500 | 4/1997 |
| JP | 09-127528 | 5/1997 |

| | | | | | |
|---|---|---|---|---|---|
| JP | 09127528 | 5/1997 | JP | 2000338501 | 12/2000 |
| JP | 09-230357 | 9/1997 | JP | 2001-005401 | 1/2001 |
| JP | 09230357 | 9/1997 | JP | 2001-005405 | 1/2001 |
| JP | 09-281511 | 10/1997 | JP | 2001-013506 | 1/2001 |
| JP | 09281511 | 10/1997 | JP | 2001005401 | 1/2001 |
| JP | 09311340 | 12/1997 | JP | 2001005405 | 1/2001 |
| JP | 10-123537 | 5/1998 | JP | 2001013506 | 1/2001 |
| JP | 10-123538 | 5/1998 | JP | 2001-033793 | 2/2001 |
| JP | 10-142616 | 5/1998 | JP | 2001-042341 | 2/2001 |
| JP | 10123537 | 5/1998 | JP | 2001-051284 | 2/2001 |
| JP | 10123538 | 5/1998 | JP | 2001033793 | 2/2001 |
| JP | 10142616 | 5/1998 | JP | 2001042341 | 2/2001 |
| JP | 10-177178 | 6/1998 | JP | 2001051284 | 2/2001 |
| JP | 10177178 | 6/1998 | JP | 2001-066615 | 3/2001 |
| JP | H10-174924 | 6/1998 | JP | 2001066615 | 3/2001 |
| JP | 10-221700 | 8/1998 | JP | 2001-091727 | 4/2001 |
| JP | 10221700 | 8/1998 | JP | 2001-117105 | 4/2001 |
| JP | 10-282512 | 10/1998 | JP | 2001-117109 | 4/2001 |
| JP | 10282512 | 10/1998 | JP | 2001091727 | 4/2001 |
| JP | 10-333157 | 12/1998 | JP | 2001117105 | 4/2001 |
| JP | 10-333159 | 12/1998 | JP | 2001117109 | 4/2001 |
| JP | 10333157 | 12/1998 | JP | 2001-133745 | 5/2001 |
| JP | 10333159 | 12/1998 | JP | 2001-133794 | 5/2001 |
| JP | 11-014953 | 1/1999 | JP | 2001-133799 | 5/2001 |
| JP | 11014953 | 1/1999 | JP | 2001-142074 | 5/2001 |
| JP | 11-038424 | 2/1999 | JP | 2001-147437 | 5/2001 |
| JP | 11038424 | 2/1999 | JP | 2001133745 | 5/2001 |
| JP | 11-064811 | 3/1999 | JP | 2001133794 | 5/2001 |
| JP | 11064811 | 3/1999 | JP | 2001133799 | 5/2001 |
| JP | 11-109388 | 4/1999 | JP | 2001142074 | 5/2001 |
| JP | 11109388 | 4/1999 | JP | 2001147437 | 5/2001 |
| JP | 11-133438 | 5/1999 | JP | 2001-154211 | 6/2001 |
| JP | 11-142864 | 5/1999 | JP | 2001-166272 | 6/2001 |
| JP | 11133438 | 5/1999 | JP | 2001-166310 | 6/2001 |
| JP | 11142864 | 5/1999 | JP | 2001154211 | 6/2001 |
| JP | 11-174477 | 7/1999 | JP | 2001166272 | 6/2001 |
| JP | 11174477 | 7/1999 | JP | 2001166310 | 6/2001 |
| JP | 11-212045 | 8/1999 | JP | 2001-183683 | 7/2001 |
| JP | 11212045 | 8/1999 | JP | 2001-201750 | 7/2001 |
| JP | 11-248930 | 9/1999 | JP | 2001183683 | 7/2001 |
| JP | 11246930 | 9/1999 | JP | 2001-209052 | 8/2001 |
| JP | H11-262712 | 9/1999 | JP | 2001-209056 | 8/2001 |
| JP | H11-264991 | 9/1999 | JP | 2001-209057 | 8/2001 |
| JP | 11-326922 | 11/1999 | JP | 2001-209058 | 8/2001 |
| JP | 11326922 | 11/1999 | JP | 2001-209060 | 8/2001 |
| JP | 11-344714 | 12/1999 | JP | 2001-215459 | 8/2001 |
| JP | 11344714 | 12/1999 | JP | 2001-222017 | 8/2001 |
| JP | 2000-002879 | 1/2000 | JP | 2001-235758 | 8/2001 |
| JP | 2000-029035 | 1/2000 | JP | 2001209052 | 8/2001 |
| JP | 2000002879 | 1/2000 | JP | 2001209060 | 8/2001 |
| JP | 2000029035 | 1/2000 | JP | 2001222017 | 8/2001 |
| JP | 2000-056311 | 2/2000 | JP | 2001235758 | 8/2001 |
| JP | 20000056311 | 2/2000 | JP | 2001-255542 | 9/2001 |
| JP | 2000-066165 | 3/2000 | JP | 2001-264782 | 9/2001 |
| JP | 2000-066218 | 3/2000 | JP | 2001021000 | 9/2001 |
| JP | 20000066165 | 3/2000 | JP | 2001255542 | 9/2001 |
| JP | 2000-093866 | 4/2000 | JP | 2001264782 | 9/2001 |
| JP | 2000-137235 | 5/2000 | JP | 2001-272640 | 10/2001 |
| JP | 2000-147528 | 5/2000 | JP | 2001-281675 | 10/2001 |
| JP | 2000137235 | 5/2000 | JP | 2001-281678 | 10/2001 |
| JP | 2000-193988 | 7/2000 | JP | 2001-282126 | 10/2001 |
| JP | 2000193988 | 7/2000 | JP | 2001-305563 | 10/2001 |
| JP | 2000-241824 | 9/2000 | JP | 2001026347 | 10/2001 |
| JP | 2000241824 | 9/2000 | JP | 2001026348 | 10/2001 |
| JP | 2000-284295 | 10/2000 | JP | 2001272640 | 10/2001 |
| JP | 2000-292799 | 10/2000 | JP | 2001281675 | 10/2001 |
| JP | 2000284295 | 10/2000 | JP | 2001282126 | 10/2001 |
| JP | 2000292799 | 10/2000 | JP | 2001305563 | 10/2001 |
| JP | 2000-310759 | 11/2000 | JP | 2001-330837 | 11/2001 |
| JP | 2000-310784 | 11/2000 | JP | 2001-330840 | 11/2001 |
| JP | 2000310759 | 11/2000 | JP | 2001330837 | 11/2001 |
| JP | 2000310784 | 11/2000 | JP | 2001330840 | 11/2001 |
| JP | 2000-338501 | 12/2000 | JP | 2001-356353 | 12/2001 |

| | | | | | | |
|---|---|---|---|---|---|---|
| JP | 2001-356354 | 12/2001 | | JP | 2002-214626 | 7/2002 |
| JP | 2001356353 | 12/2001 | | JP | 2002202512 | 7/2002 |
| JP | 2001356354 | 12/2001 | | JP | 2002202514 | 7/2002 |
| JP | 2002-014360 | 1/2002 | | JP | 2002214626 | 7/2002 |
| JP | 2002-023176 | 1/2002 | | JP | 2002-229042 | 8/2002 |
| JP | 2002014360 | 1/2002 | | JP | 2002-236276 | 8/2002 |
| JP | 2002023176 | 1/2002 | | JP | 2002-258299 | 8/2002 |
| JP | 2002-049045 | 2/2002 | | JP | 2002-236292 | 9/2002 |
| JP | 2002049045 | 2/2002 | | JP | 2002-277865 | 9/2002 |
| JP | 2002-079160 | 3/2002 | | JP | 2002-277866 | 9/2002 |
| JP | 2002-080321 | 3/2002 | | JP | 2002-277881 | 9/2002 |
| JP | 2002-082340 | 3/2002 | | JP | 2002-287156 | 10/2002 |
| JP | 2002-090759 | 3/2002 | | JP | 2002-296605 | 10/2002 |
| JP | 2002-090760 | 3/2002 | | JP | 2002-311438 | 10/2002 |
| JP | 2002082340 | 3/2002 | | JP | 2002-311440 | 10/2002 |
| JP | 2002090759 | 3/2002 | | JP | 2002-311442 | 10/2002 |
| JP | 2002090760 | 3/2002 | | JP | 2002-323687 | 11/2002 |
| JP | 2002-107740 | 4/2002 | | JP | 2002-323694 | 11/2002 |
| JP | 2002-122870 | 4/2002 | | JP | 2002-333628 | 11/2002 |
| JP | 2002-122872 | 4/2002 | | JP | 2002-333635 | 11/2002 |
| JP | 2002-122873 | 4/2002 | | JP | 2002-333843 | 11/2002 |
| JP | 2002107740 | 4/2002 | | JP | 2002-341329 | 11/2002 |
| JP | 2002122872 | 4/2002 | | JP | 2002-341355 | 11/2002 |
| JP | 2002122873 | 4/2002 | | JP | 2002-341356 | 11/2002 |
| JP | 2002-131762 | 5/2002 | | JP | 2002-341357 | 11/2002 |
| JP | 2002-139734 | 5/2002 | | JP | 2002-341358 | 11/2002 |
| JP | 2002-156518 | 5/2002 | | JP | 2002-341359 | 11/2002 |
| JP | 2002-169166 | 6/2002 | | JP | 2002-341362 | 11/2002 |
| JP | 2002-169167 | 6/2002 | | KP | 20000035302 | 6/2000 |
| JP | 2002-182222 | 6/2002 | | KR | 2000-0035302 | 6/2000 |
| JP | 2002080321 | 6/2002 | | | | |
| JP | 2002-202512 | 7/2002 | | | | |
| JP | 2002-202514 | 7/2002 | | | | |

* cited by examiner

CONVEYOR SYSTEM HAVING WIDTH ADJUSTMENT UNIT

This application is a Continuation-In-Part (CIP) of application Ser. No. 10/303,922 filed Nov. 26, 2002 now abandoned, which is hereby incorporated by reference as if fully set forth herein. This application claims the benefit of the Korean Application No. P2002-033500 filed on Jun. 15, 2002 and Korean Application No. P2003-67827, filed on Sep. 30, 2003, both of which are also hereby incorporated by reference.

BACKGROUND OF THE INVENTION

1. Field of the Invention

The present invention relates to a conveyor system for conveying liquid crystal panels, more particularly the present invention relates to a conveyor system having a width adjustment unit.

2. Discussion of the Related Art

Generally, liquid crystal displays are devices that display images using liquid crystal cells arranged in a matrix pattern. Data signals, representative of image information, may be used to selectively control the light transmittance of each of the liquid crystal cells.

Liquid crystal displays are fabricated by forming a plurality of thin film transistor (TFT) substrates within a first substrate, forming a plurality of color filter substrates within a second substrate, bonding the first and second substrates to each other, and cutting the bonded first and second substrates into a plurality of liquid crystal panels, wherein each liquid crystal panel includes a TFT substrate bonded to a color filter substrate.

The TFT substrates are fabricated according to a process including deposition, photolithography, and etching to form an array of TFTs. The color filter substrates are fabricated according to a color filter fabricating process. The liquid crystal panels are fabricated according to a liquid crystal cell fabricating process.

Each of the TFT substrates include a plurality of gate lines arranged at fixed intervals along a first direction, and a plurality of data lines arranged at fixed intervals along a second direction, perpendicular to the first direction. Pixel areas, located at crossings of the gate and data lines, include a plurality of thin film transistors (TFTs) and pixel electrodes.

In order to prevent leakage of liquid outside the pixel areas of each of the color filter substrates, the color filter fabricating process includes a step of forming a black matrix layer in regions of the color filter substrate that do not correspond to the pixel areas. The color filter fabricating process further includes steps of forming red, green, and blue color filters, and an ITO (indium tin oxide) common electrode layer.

After the arrays of TFTs are formed, and after the color filter fabrication process is executed, the liquid crystal cell fabricating process is performed on the first and second substrates as follows.

Referring to FIG. 1, after an alignment material has been coated on the TFT and color substrate portions of the first and second substrates, respectively, an alignment process (1S) is performed on the coated alignment material to uniformly align liquid crystal material to be injected into the cell gap. The alignment process (1S) is performed by pre-cleaning each of the first and second substrates, printing the alignment layer on the TFT and color substrate portions of the first and second substrates, respectively, plasticizing the alignment layers, inspecting the alignment layers, and rubbing the alignment layers.

After the alignment process 1S is completed, a gap formation process is then performed. During the gap formation process, the first and second substrates are cleaned (2S), spacers are dispensed on the first substrate so as to ensure uniformity of the cell gap (3S), sealant is dispensed on each color filter substrate within the second substrate and a liquid crystal injection inlet is formed at an edge portion of each liquid crystal panel (4S), and the first and second substrates are pressed and bonded together (5S).

The bonded first and second substrates are then cut and processed into a plurality of liquid crystal panel (6S).

Subsequently, liquid crystal material is injected through the liquid crystal injection inlet into the cell gap of each of the liquid crystal panels and the liquid crystal injection inlet is then sealed (7S).

Lastly, cut surfaces of the first and second substrates are then polished, and an exterior and electrical failure inspection is performed (8S).

The liquid crystal injection process will now be described in greater detail.

In injecting liquid crystal material, liquid crystal material is provided within a liquid crystal container, the liquid crystal container is loaded into a vacuum chamber, and pressure in the vacuum chamber is reduced, thereby creating a vacuum within the vacuum chamber so that any moisture adhered to the inner surface of the liquid crystal container or any air bubbles in the liquid crystal material are removed.

While maintaining the vacuum within the vacuum chamber, the liquid crystal injection inlet of an empty LC cell contacts, or is dipped into, the liquid crystal material in the liquid crystal container. The pressure of the vacuum chamber is then increased and, due to the pressure difference between the interior of the empty LC cell and the interior of the vacuum chamber, liquid crystal material is injected through the liquid crystal injection inlet into the cell gap.

FIG. 2 illustrates the TFT and color filter substrates 100 and 200, respectively. A plurality of gate lines 50 arranged at fixed intervals along a first direction and a plurality of data lines 60 arranged at fixed intervals along a second direction, perpendicular to the first direction, are formed on the TFT substrate. A plurality of thin film transistors (TFTS) and pixel electrodes are formed in pixel areas 70 defined by the crossing of the gate and data lines 50 and 60, respectively. A plurality of pixel areas 70 generally define an image display area 80. While not shown in FIG. 2, each of the TFTs includes gate and source electrodes formed in respective pixel areas 70 that are connected to corresponding gate and data lines 50 and 60, respectively. Drain electrodes of the TFTs are connected to corresponding to pixel electrodes arranged in corresponding pixel areas 70.

A plurality of the gate and data lines 50 and 60, respectively, are connected to gate pads and data pads 90 and 110, respectively, arranged at a periphery of the array substrate 100.

A shorting bar is provided to facilitate the inspection of the liquid crystal panels to determine if any defective characteristics were imparted to the panel during any of the aforementioned fabricating processes. The shorting bar is removed after fabrication of the liquid crystal device is complete. The shorting bar includes first to fourth sub-shorting bars 120 to 123 that are used to separately inspect odd and even data and gate lines 50 and 60, respectively. The first to fourth sub-shorting bars 120 to 123 extend toward ends of the TFT substrate such that they may couple to external terminals (not shown).

The color filter substrate 200 is slightly smaller than the TFT substrate. A black matrix layer 210 is formed on the color filter substrate 200 for preventing leakage of light in regions outside pixel areas 70. A color filter layer (not shown), common electrode (not shown), column-type spacers (not shown) may also be formed on color filter substrates used in large liquid crystal displays.

The column-type spacers arranged in correspondence with gate and data lines of the TFT substrate. A black matrix rim 220 is provided to prevent leakage of light outside the display area 80.

The TFT and color filter substrates 100 and 200, respectively, are bonded to each other using a sealant (not shown) made of photo-hardening or thermo-hardening resin.

The substrates (e.g., bonded TFT and color filter substrates, bonded first and second substrates, unbonded first and second substrates, etc.) are transported between various fabricating processes (e.g., grinding processes, cleaning processes, etc.) via a variable width conveyor system.

Conveyors systems, such as those illustrated in FIG. 3, include a plurality of rotating rollers 300 having supporting ends 300A spaced apart from each other by a predetermined width. The rotating rollers 300 rotate to convey substrates 100A from one location to another. Edges of the substrates 100A are arranged on and contact supporting ends 300A of the rotating roller 300. The substrates 100A are transported according to the electrical characteristics of the panel area of liquid crystal panels. Static electricity may be generated due to friction caused by contact between the liquid crystal panels and the supporting ends 300A. Accordingly, supporting ends 300A are arranged to contact edges of the liquid crystal panels that include the gate pads or data pads 90 or 110, respectively, and the black matrix rim 220 to thereby minimize the risk of generating static electricity.

Conveyor systems such as those illustrated in FIG. 3, however, are disadvantageous for the following reasons.

During the liquid crystal cell fabricating process, the width between the supporting ends 300A must be optimally adjusted to efficiently transport liquid crystal panels. To adjust the width between the supporting ends 300A, a screw (not shown) is manually turned. In manually turning the screw, the efficiency of the conveyor system is reduced.

Moreover, upon manually turning the screw, the width may be incorrectly adjusted and one of the supporting ends 300A may contact the unit liquid crystal panels in a manner capable of generating static electricity. Static electricity damages the alignment layer and degrades the injected liquid crystal material.

Now making reference to FIG. 4, FIG. 4 illustrates a related art conveyor. Briefly, a conveyor is a machine which transfers materials and goods at a constant distance in succession, and the conveyor is usually used for transfer of components, materials and semiprocessed goods within a factory, for transfer of coal and ore in a mine, and for transfer of sand in a construction site. The conveyor is categorized into a fixed type system of transferring goods having the same size, and an adjustable type system of transferring goods having the different sizes by adjusting a width according to the size of goods. As shown in FIG. 4, the conveyor is provided with a transfer unit 1, conveyor plates 2, and a width adjustment unit. At this time, the transfer unit 1 transfers goods, and the conveyor plates 2 are provided at both sides of the transfer unit 1 to support and guide goods. Also, the width adjustment unit adjusts the width of the conveyor plate 2 to the size of goods.

The transfer unit 1 is provided with a plurality of rollers 1a and a motor (not shown), wherein the plurality of rollers 1a are provided in a goods-traveling direction inside the conveyor plate 2, and the motor (not shown) drives the plurality of rollers 1a.

Meanwhile, the width adjustment unit is provided with a motor 3a for adjusting the width, a power-transmission bevel gear 3b synchronized with the motor 3a, fixed screw nuts 3c penetrating the conveyor plates provided at both sides of the transfer unit 1, and a shaft 3d having a right-handed screw and a left-handed screw on both sides of a central portion to penetrate the screw nuts 3c and having one end connected with the motor 3a and the power-transmission bevel gear 3b. Also, the screw nut 3c is comprised of a ball nut or a common nut.

In the conveyor having the aforementioned structure, the process of adjusting the width in correspondence with the size of goods will be described as follows. First, as the motor 3a for adjusting the width is driven at the clockwise direction or counterclockwise direction, the bevel gear 3b synchronized with the motor 3a is driven. Then, the shaft 3d connected with the motor 3a and the bevel gear 3b is rotated at the clockwise direction or counterclockwise direction, whereby the conveyor plate 2, to which the screw nut 3c is fixed, widens or narrows according to the size of traveling-goods.

However, in case of the aforementioned width adjustment unit, a pitch is inconstant since the shaft 3d and the screw nut 3c are not processed precisely. As a result, it is difficult to determine a precise position, whereby the width of the conveyor plate is inconstant. Also, if the shaft and the screw nut are processed precisely in the aforementioned width adjustment unit of the conveyor, it causes the rise of fabrication cost. On the process of transferring the goods, even if the shaft and the screw nut are processed precisely, minute particles of lubricant, detergent or foreign matters may be caught in the shaft and the screw nut, so that the shaft and the screw nut may not be driven smoothly. Also, the width adjustment unit of the conveyor has short life span, whereby it is necessary to replace the width adjustment unit with new one at short intervals.

SUMMARY OF THE INVENTION

Accordingly, the present invention is directed to a conveyor system capable of automatically adjusting a width that substantially obviates one or more problems due to limitations and disadvantages of the related art.

An advantage of the present invention is to provide a conveyor system capable of automatically adjusting a width, and to minimize operation failure due to foreign matter.

Additional advantages, and features of the invention will be set forth in part in the description which follows and in part will become apparent to those having ordinary skill in the art upon examination of the following or may be learned from practice of the invention. These advantages of the invention may be realized and attained by the structure particularly pointed out in the written description and claims hereof as well as the appended drawings.

To achieve these advantages and in accordance with the purpose of the invention, as embodied and broadly described herein, a conveyor system includes a transfer unit for transferring goods; conveyor plates provided at both sides of the transfer unit, and guiding the goods by supporting both sides of the goods; and a width adjustment unit including a wire connected with the conveyor plates, a driving pulley operating the wire, and a driven pulley connected with the wire.

In another aspect of the present invention, a conveyor system comprising a support and a width adjustment unit is disclosed. The support is configured to support a liquid crystal panel. The width adjustment unit is configured to adjust a width of the conveyor system according to a dimension of the liquid crystal display device.

At this time, is, it is possible to minimize failure of operation of the conveyor system by preventing foreign matter from being caught in the width adjustment unit, thereby realizing the balanced and uniform width adjustment in the system.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention.

In the drawings.

DETAILED DESCRIPTION OF THE ILLUSTRATED EMBODIMENTS

Reference will now be made in detail to embodiments of the present invention, examples of which are illustrated in the accompanying drawings. Wherever possible, the same reference numbers will be used throughout the drawings to refer to the same or like parts.

Figure 1:
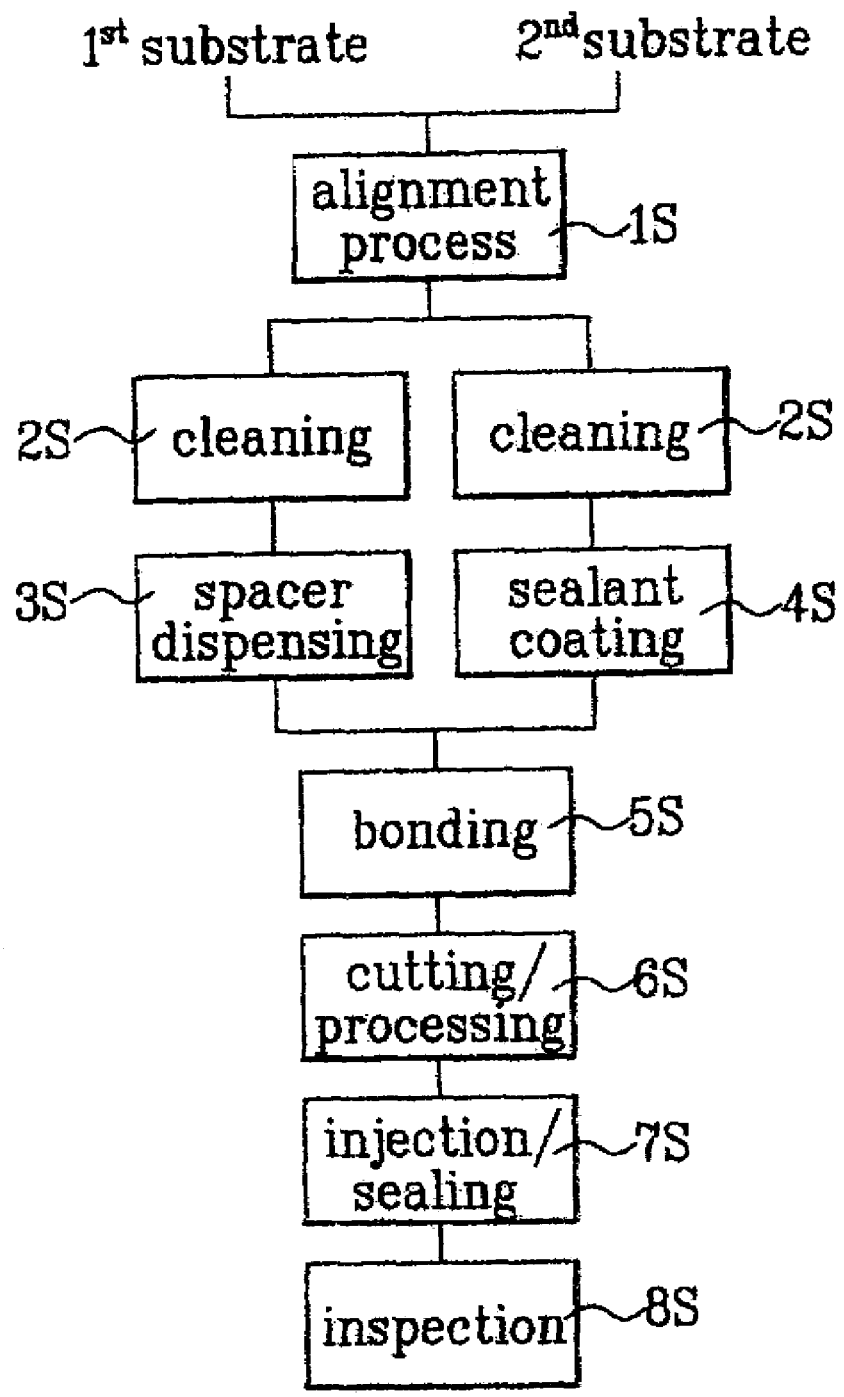
FIG. 1 illustrates a flowchart of a liquid crystal display fabrication method incorporating liquid crystal injection technique in accordance with the related art.
Figure 2:
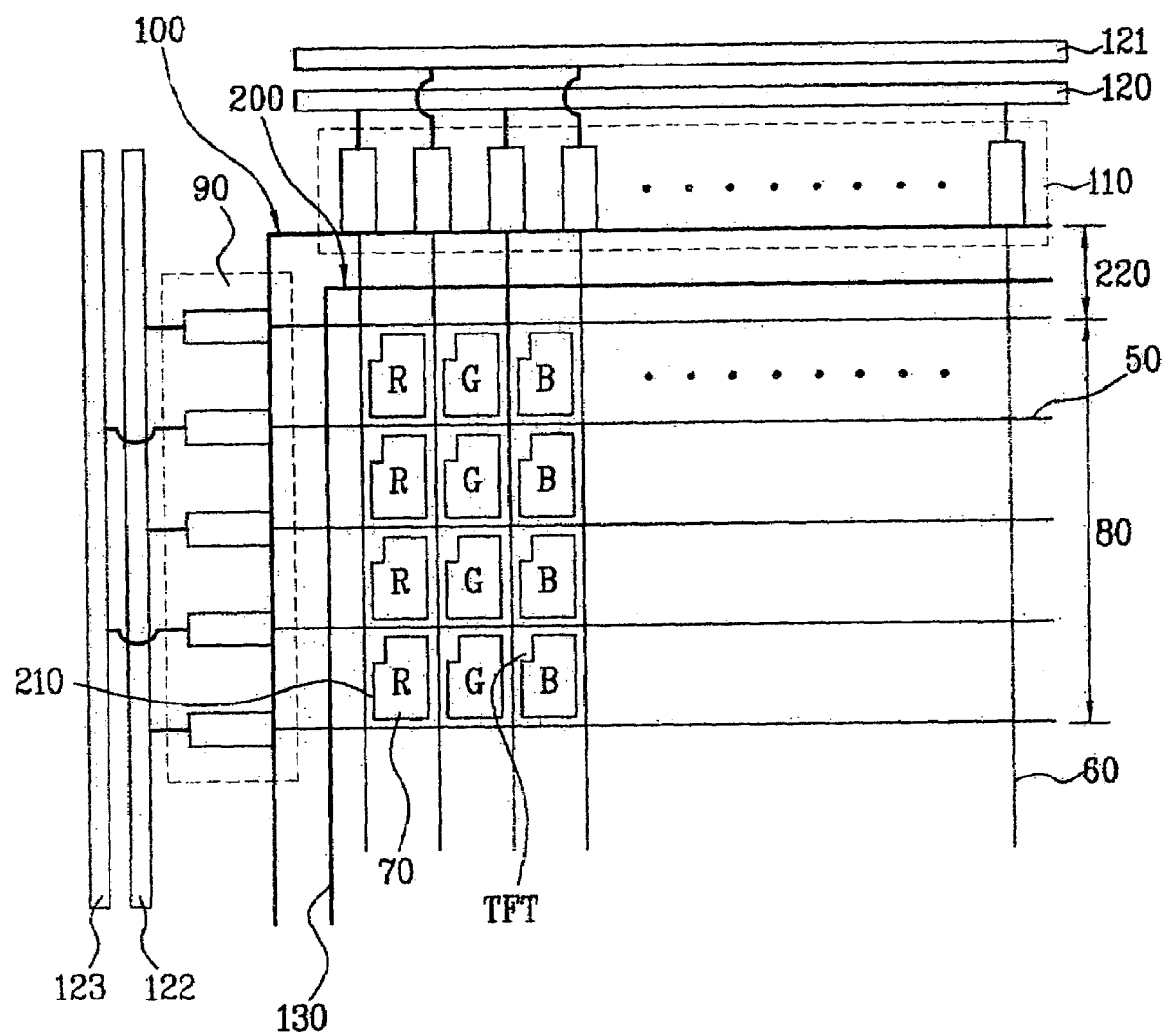
FIG. 2 illustrates a schematic view of a liquid crystal panel in accordance with the related art.
Figure 3:
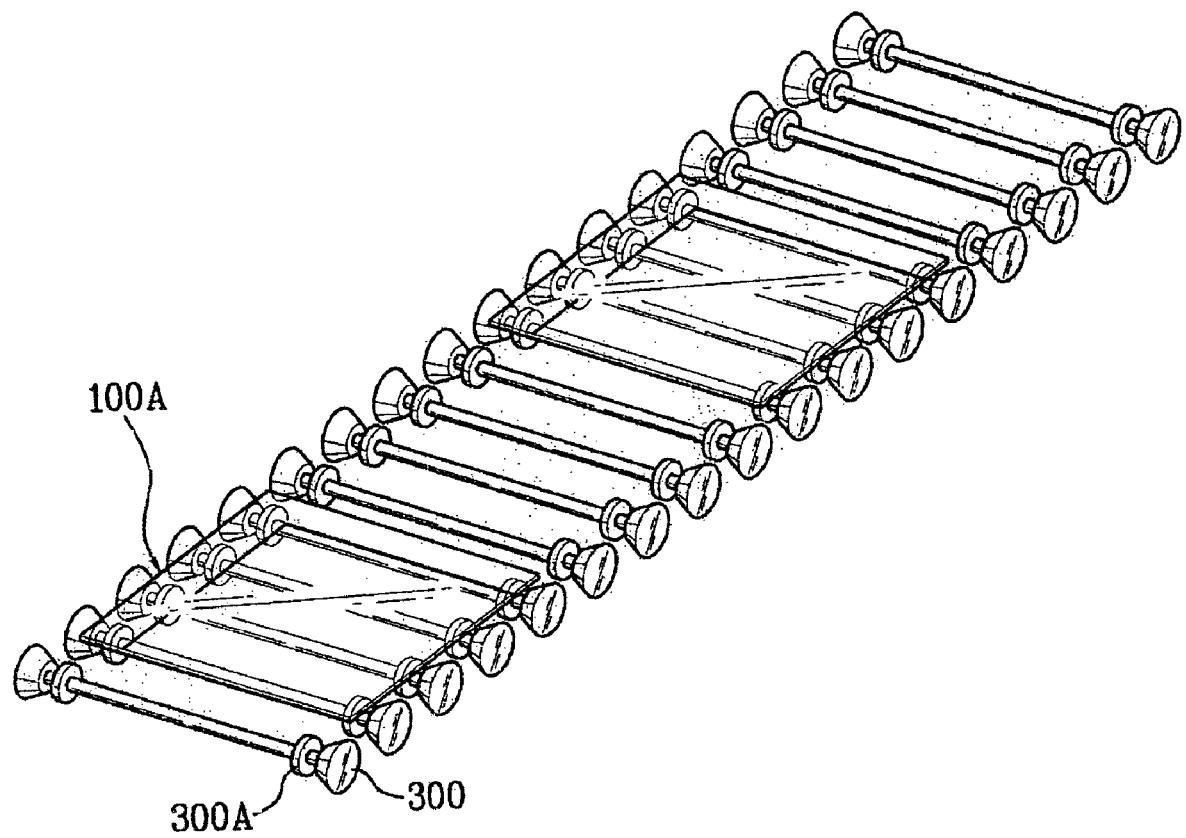
FIG. 3 illustrates a perspective view of a conveyor system for conveying a liquid crystal panel in accordance with the related art.
Figure 4:
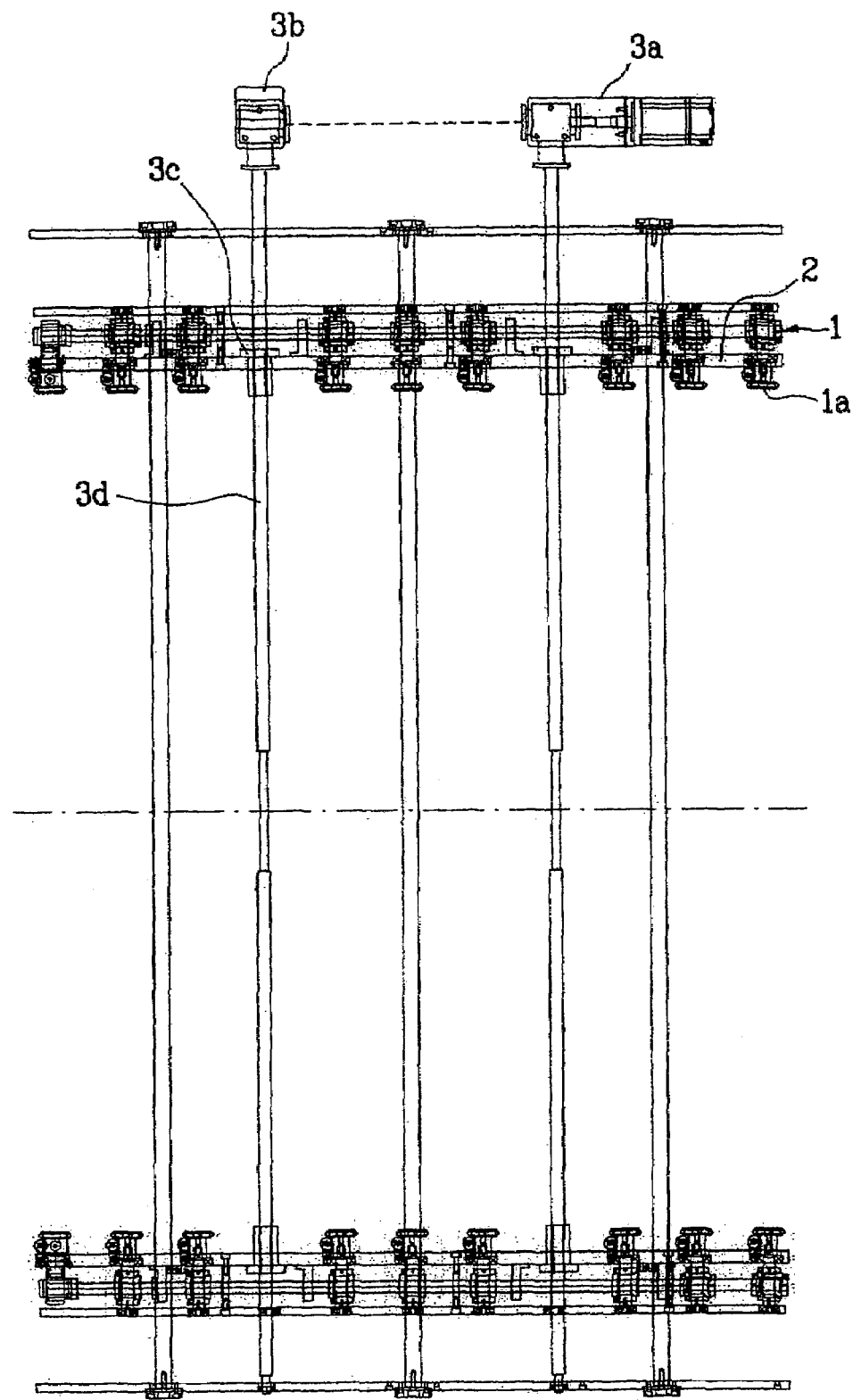
FIG. 4 schematically illustrates a related art conveyor system having a width adjustment unit.
Figure 5:
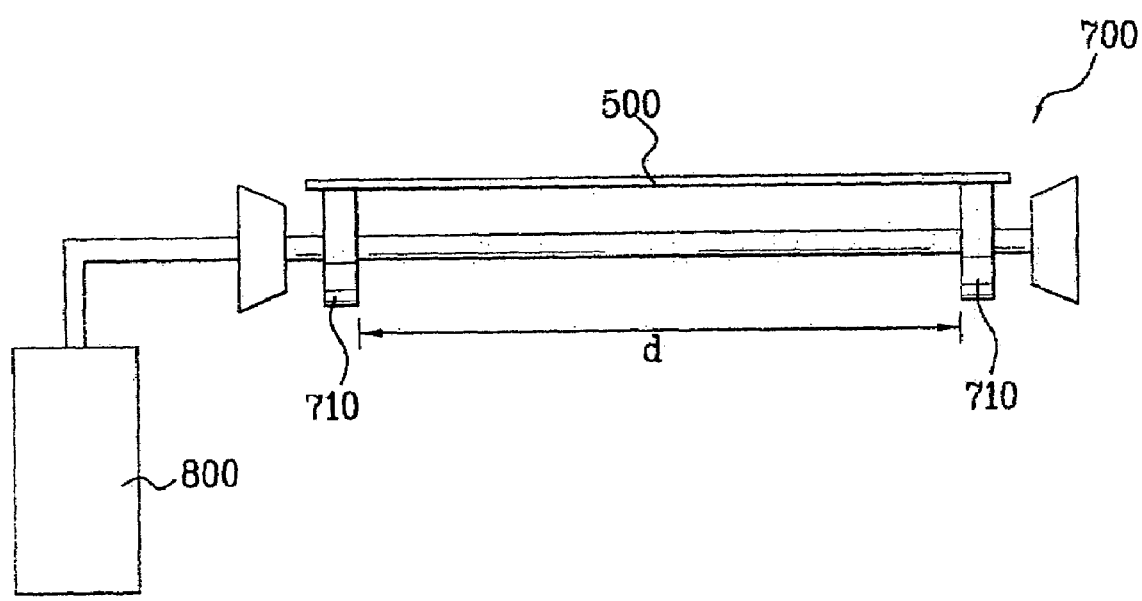
FIG. 5 illustrates a front view of a conveyor system for conveying a liquid crystal panel according to the present invention.

FIG. 5 illustrates a front view of a conveyor of a conveyor system for conveying goods, such as a liquid crystal panel, according to the present invention.

Referring to FIG. 5, a liquid crystal panel 500, including TFT and color filter substrates bonded to each other, may be arranged on a rotating roller 700 of a conveyor system.

In one aspect of the present invention, the liquid crystal panel may prepared by injecting liquid crystal material between first and second substrate including TFT and color filter substrates, respectively, and cutting the injected first and second substrates (e.g., using a cutting wheel).

In one aspect of the present invention, the cutting wheel may comprise a material having a hardness higher than that of glass (e.g., diamond) and include blades may formed along a periphery of front and rear faces.

The cutting wheel may be closely held to the bonded substrates using a uniform pressure. Upon rotating, the cutting wheel forms a groove in the bonded substrates to predetermined depth. After the groove has been formed, a crack may be propagated downward by impacting the bonded substrates. Accordingly, a plurality of liquid crystal panels 500 may thereby be formed from the bonded substrates.

Referring to FIG. 5, the liquid crystal panel 500 may be transported using a conveyor system that includes at least one rotating roller 700. Accordingly, the rotating roller may be used to convey the liquid crystal panel 500 to a location where an inspection may be performed to evaluate the presence of burrs, or other imperfections, on sides of the liquid crystal panel 500 (e.g., the side including the data pad, the side including gate pad, or any other sides).

In one aspect of the present invention, the rotating roller 700 may include a plurality of supporting ends 710 arranged along one direction and separated by a width, d, to transport the liquid crystal panel 500. The width, d, may be adjusted in accordance with requirements of the liquid crystal panel 500 such that edges of the liquid crystal panel 500 substantially continuously contact the supporting ends 710. Furthermore, the width d may be adjusted in accordance with the width of other goods such that ends of the goods substantially continuously contact the supporting ends 710.

Accordingly, adjustment of the width, d, may be required and automatically achieved using at least one servo-motor 800 arranged at a side of the rotating roller 700. In one aspect of the present invention, the servo-motor 800 may receive data related to the liquid crystal panel and logically and numerically determine the orientation of the supporting ends 710.

In one aspect of the present invention, the servo-motor 800 may automatically adjust the position, direction, orientation, and the like, of the each of the supporting ends 710 in proportion to a random variance of an input target value. The servo system may include a high-precision servo-mechanism such as a numerical controller of an operation machine, a data floater of a digital calculator output, and the like.

In one aspect of the present invention, the servo-motor 800 may be coupled to the rotating roller 700 to improve the operational productivity of the rotating roller 700 and thus conveyor system. Accordingly, the servo-motor may reduce time required for retooling, maintaining a continuous conveyance of liquid crystal panels, and simplify various fabricating processes (e.g., grinding, cleaning cut sides of panels, etc.) that are involved in conveyance of the liquid crystal panel.

According to the principles of the present invention, the rotating roller 700 facilitating the conveyance of liquid crystal panels is advantageous for the following reasons.

The present invention may include a servo-motor arranged at a side of the conveyor for numerically and logically calculating the dimensions of goods being transported by the conveyor, such as liquid crystal panels, thereby enabling the automatic adjustment of the width between supporting ends or rotating rollers. By automatically adjusting the width of the supporting ends, the supporting ends 710 may be provided to substantially continuously contact edge portions of goods, such as liquid crystal panels. Where liquid crystal panels are being transported, the edge portions include gate pad, data pad, and black matrix structures, the risk of generating static electricity in the liquid crystal panel, upon conveyance of the liquid crystal, may be minimized.

Hereinafter, a conveyor system having a width adjustment unit according to a further embodiment of the present invention will be described with reference to FIG. 6 to FIG. 10.

Figure 6:
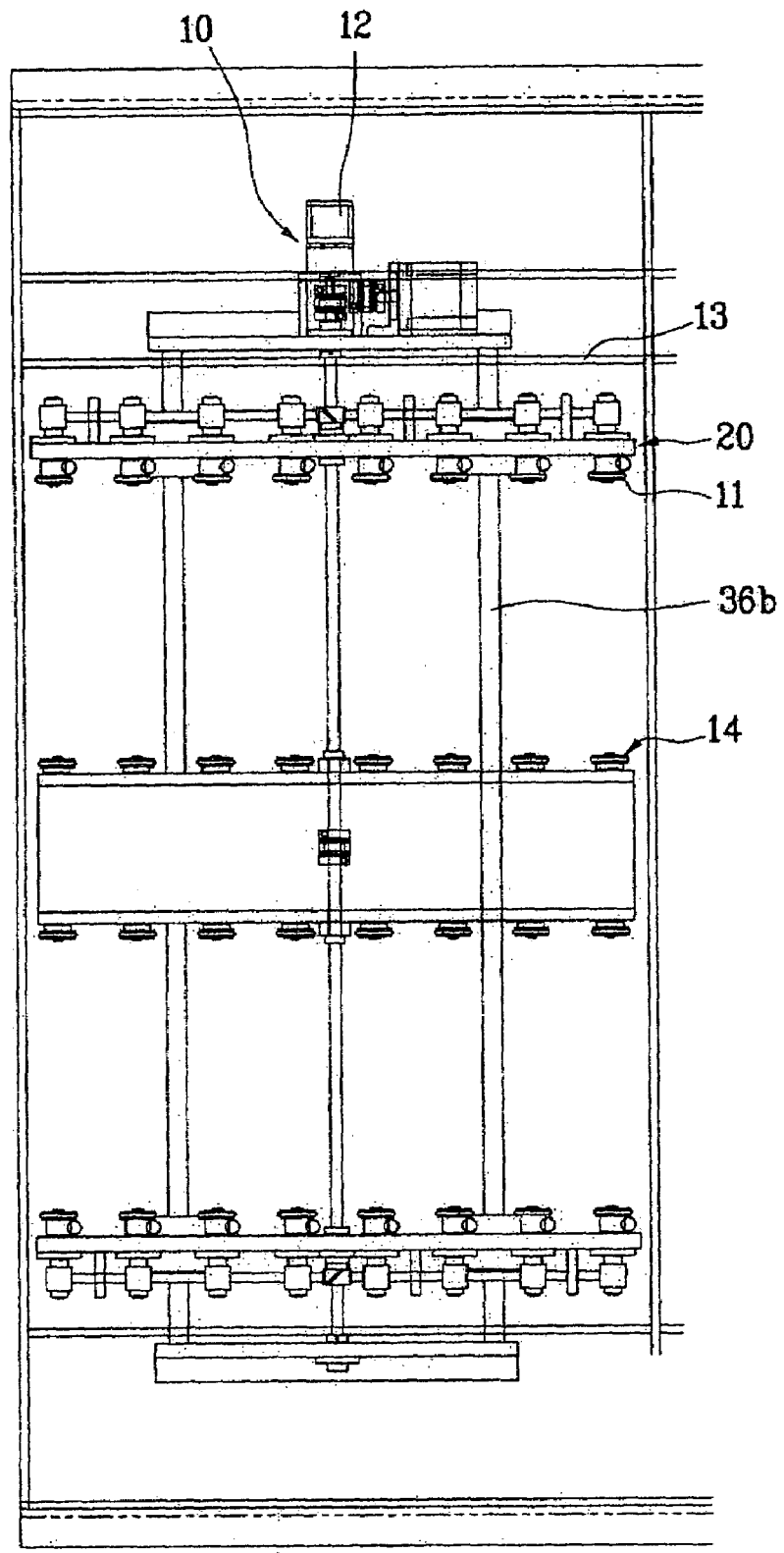
FIG. 6 schematically illustrates a conveyor system having a width adjustment unit according to the present invention.
Figure 7:
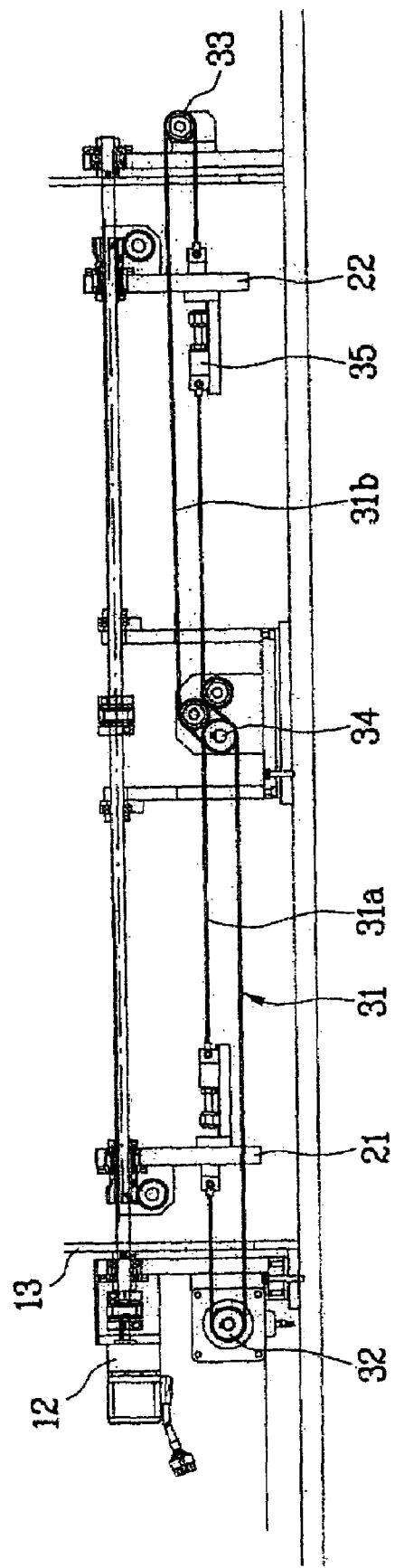
FIG. 7 illustrates a wire-pulley part of a width adjustment unit according to the present invention.

FIG. 6 schematically illustrates a conveyor system having a width adjustment unit according to the present invention. FIG. 7 illustrates a wire-pulley part of a width adjustment unit according to the present invention.

Referring to FIG. 6, the conveyor system having the width adjustment unit according to the present invention is provided with a transfer unit 10, conveyor plates 20, and the width adjustment unit 30. At this time, the transfer unit 10 transfers goods, and the conveyor plates 20 supporting and guiding goods are provided at both sides of the transfer unit 10.

Also, the transfer unit 10 is provided with a plurality of rollers 11, a motor 12, and support means 13. The plurality of rollers 11 are provided in a goods-traveling direction within each conveyor plate, and the motor 12 drives the plurality of rollers 11. Also, the support means 13 supporting the rollers 11 and the motor 12 are provided along the both sides of the conveyor system.

At this time, the rollers 11 and the support means 13 may be formed of outer walls provided along the conveyor system, or supporters provided at fixed intervals.

The conveyor plate 20 is formed of a thin plate type, to support and guide goods. Thus, the distance between both conveyor plates 20 is determined in consideration of the width of goods. Also, the distance between the conveyor plates 20 is adjusted with the width adjustment unit 30.

The width adjustment unit 30 is provided with a wire 31 connected to the conveyor plate, a driving pulley 32 for operating the wire 31, and a driven pulley 33 connected by the wire 31. The width adjustment unit 30 further may include an intermediate pulley provided between the driving pulley 32 and the driven pulley 33. If the driving pulley 32 is distant from the driven pulley 33, the wire 31 wound on the driving pulley and the driven pulley may be loosened, so that it prevents a balanced and smooth operation of the conveyor plate 20. Also, the driving pulley may be driven by the motor.

In the meantime, the wire 31 is wound on the driving pulley and the driven pulley using an open belt configuration. An upper side of the wire 31a provided at a side of the driving pulley 32 from the intermediate pulley 34 is connected with the conveyor plate 21 of the driving pulley, and a lower side of the wire 31b provided at a side of the driven pulley 33 is connected with the conveyor plate 22 of the driven pulley. In this state, a lower side of the wire 31a provided at a side of the driving pulley 32 from the intermediate pulley 34 is connected with the conveyor plate 21 of the driving pulley, and an upper side of the wire 31b provided at a side of the driven pulley is connected with the conveyor plate 22 of the driven pulley.

The width adjustment unit 30 further may include a tension control part 35 provided on the middle of the wire, to maintain a tension. That is, the tension control part 35 is provided to maintain the tension at a predetermined level or more, thereby preventing sliding of the wire, and obtaining the balanced operation of the both-sided conveyor plates. At this time, the tension control part 35 is provided with a first tension control part 35a and a second tension control part 35b, wherein the first tension control part 35a is provided on the wire of connecting the driving pulley with the intermediate pulley, and the second tension control part 35b is provided on the wire of connecting the driven pulley with the intermediate pulley, to maintain the tension of wire. The tension control part 35 may be comprised of a set of a bolt and a nut, having a tension gauge at one side therein.

Figure 8A:
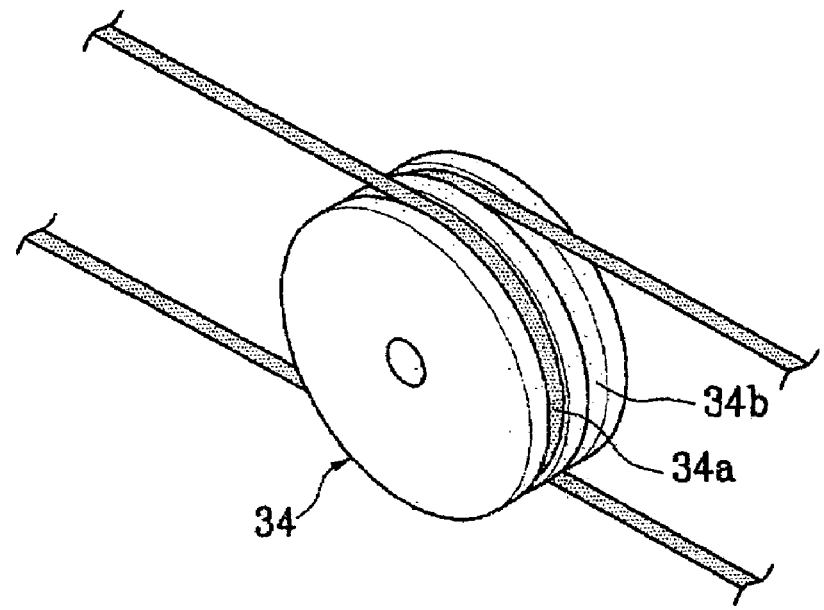
FIG. 8A and FIG. 8B illustrate a intermediate pulley in a width adjustment unit according to the present invention.
Figure 8B:
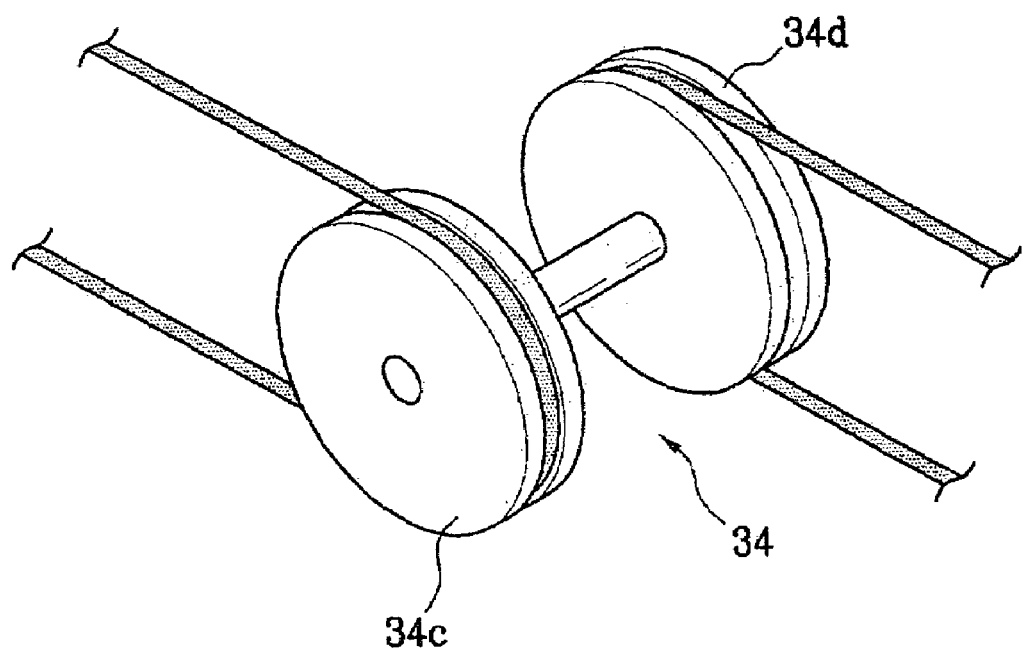

The intermediate pulley 34 of the present invention will be described with reference to FIGS. 8A and 8B. As illustrated in FIG. 8A, the intermediate pulley 34 may be provided with a first groove 34a for the wire connected with the driving pulley, and a second groove 34b for the wire connected with the driven pulley. Also, as illustrated in FIG. 8B, the intermediate pulley 34 may be provided with a first intermediate pulley 34c for the wire connected with the driving pulley, and a second intermediate pulley 34d for the wire connected with the driven pulley, the second intermediate pulley 34d provided on the same axle with the first intermediate pulley 34c.

Figure 9:
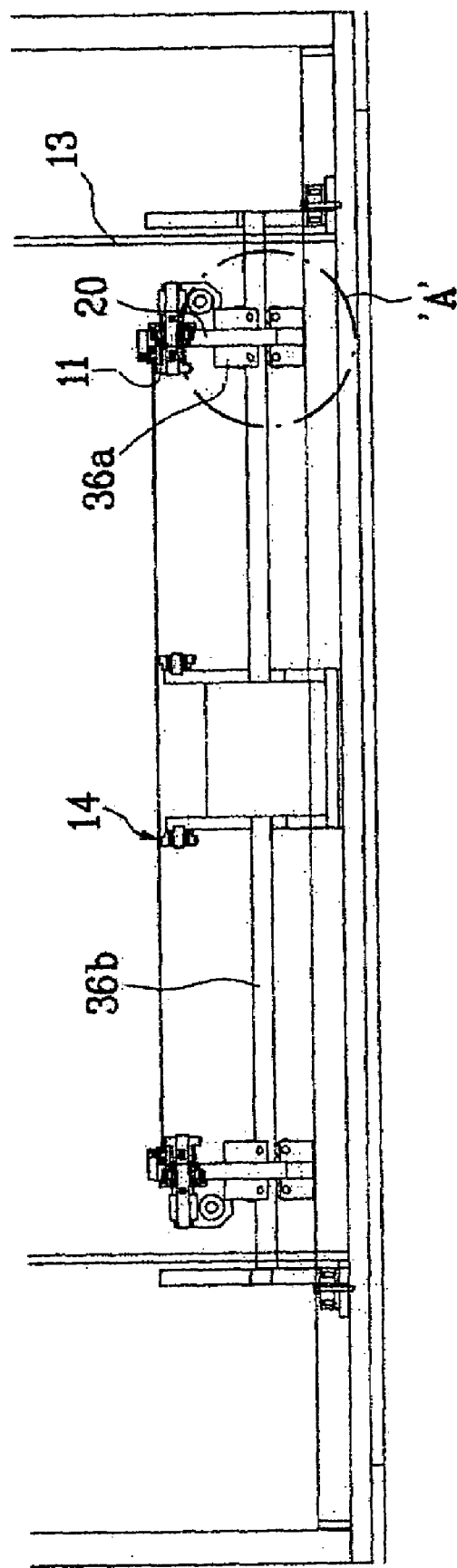
FIG. 9 illustrates a guide part of a width adjustment unit according to the present invention.

As illustrated in FIG. 9, the width adjustment unit 30 may further include a guide part 36 guiding and supporting the smooth operation of the conveyor plate 20. In other words, the conveyor plate 20 is operated to the left and right sides as driving the wire-pulley part by the help of the guide part.

Figure 10:
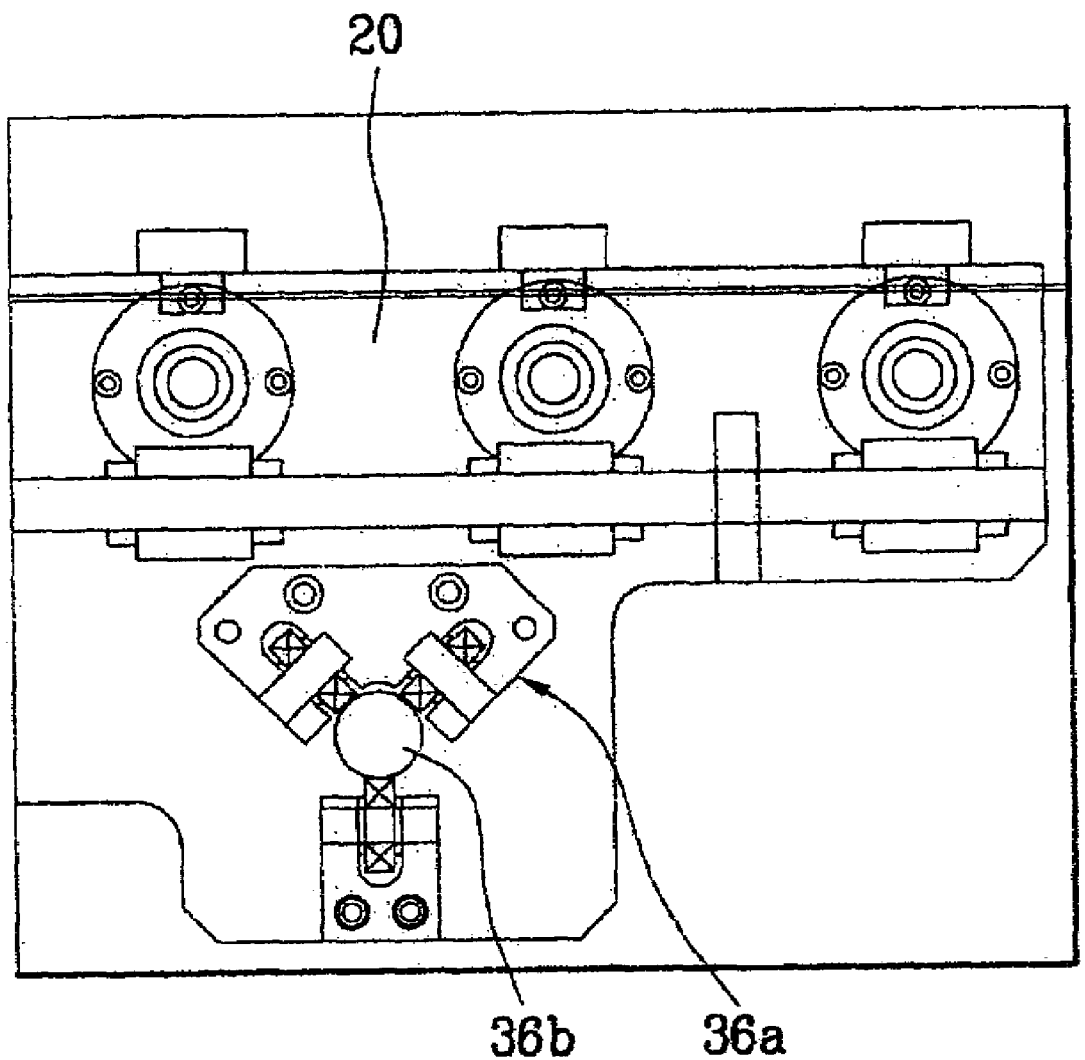
FIG. 10 illustrates "A" portion of FIG. 9.

FIG. 10 illustrates portion "A" of FIG. 9.

Referring to FIG. 9 and FIG. 10, the guide part 36 is provided in one with the conveyor plate, wherein the guide part 36 is provided with a bearing 36a supporting a lower side of the conveyor plate, and a guide shaft 36b supporting and guiding the bearing 36a. The guide shaft 36b may be formed in a substantially cylindrical shape, and the bearing 36a has a rolling operation along the circumferential surface of the length direction of the guide shaft 36b.

More specifically, the bearing 36a is in contact with the guide shaft 36b at three points, wherein the three points of the guide shaft 36b, may be in contact with the bearing 36a, such that the three points of contact are offset from each other at a same angle relative to the center of the guide shaft 36b, as illustrated in FIG. 10.

The bearing 36a may be formed of resin or ceramic material to minimize failure of operation generated by foreign matter or moisture. That is, it is possible to prevent minute particles of lubricant, detergent or foreign matter from being caught in the system, or to prevent the rust on the system, on the process of transferring semiprocessed goods, thereby realizing the smooth operation of the system.

The guide part 36 may be provided in front or rear of the wire-pulley part on the process line of transferring goods. For the case of transferring the wide goods, the transfer unit 10 may include an auxiliary roller 14 of supporting the center of goods between the both conveyor plates. For example, the auxiliary roller 14 is used to transfer the goods, such as large sized LCD panels, which are wide, or are apt to have the central part being curved.

An operation of the conveyor system having the width adjustment unit 30 according to the present invention will be described as follows.

After setting the width of the goods for transfer, the driving pulley 32 operates the wire 31. Especially, in the width adjustment unit of FIG. 7, as the driving pulley 32 is rotated at the clockwise direction, the intermediate pulley 34 and the driven pulley 33 are rotated at the clockwise direction. Accordingly, the conveyor plate connected with the wire moves to the central part of the conveyor system and narrows the width. On the contrary, if the driving pulley 32 is rotated at the counterclockwise direction, the intermediate pulley and the driven pulley are rotated at the counterclockwise direction. Accordingly, the conveyor plate connected with the wire is distant from the central part of the conveyor system, thereby widening the width. After adjusting the width of the conveyor system in correspondence with the size of goods, the motor of the transfer unit 10 rotates the roller 11, whereby the goods are transferred.

The aforementioned conveyor system may used to transfer LCD panels having the different sizes from the small size to the large size, according to the model, as well as general goods. In other words, the conveyor system according to the present invention may be used to transfer various goods having the different sizes, applied to one fabrication process line.

As mentioned above, the conveyor system having the width adjustment unit according to the present invention has the following advantages.

First, it is possible to prevent minute particles of lubricant, detergent or foreign matter from being caught in the width adjustment unit of the conveyor system, or to prevent the rust on the system, thereby realizing the smooth operation of the system.

Also, it is possible to maintain the balanced and uniform width of the conveyor plate with the smooth operation of the width adjustment unit.

Furthermore, the width adjustment unit is operated smoothly, so that it is possible to rapidly adjust the width of the conveyor system according to the size of goods transferred, thereby improving yield by the decrease of the setup time for the fabrication process.

In addition, since it is possible to prevent minute particles of lubricant, detergent or foreign matter from being caught in the system, or to prevent the rust on the system, on the process of transferring the goods, the lifespan of the width adjustment unit increases, thereby decreasing the cost for replacement of the width adjustment unit.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A conveyor system having a width adjustment unit, comprising:
   a transfer unit for transferring goods;
   conveyor plates provided at both sides of the transfer unit, and guiding the goods by supporting both sides of the goods; and
   the width adjustment unit including a wire connected with the conveyor plates, a driving pulley operating the wire, and a driven pulley connected with the wire,
   wherein the width adjustment unit further includes an intermediate pulley provided between the driving pulley and the driven pulley, and
   wherein the intermediate pulley includes:
   a first groove for the wire connected with the driving pulley; and
   a second groove for the wire connected with the driven pulley.

2. A conveyor system having a width adjustment unit, comprising:
   a transfer unit for transferring goods;
   conveyor plates provided at both sides of the transfer unit, and guiding the goods by supporting both sides of the goods; and
   the width adjustment unit including a wire connected with the conveyor plates, a driving pulley operating the wire, and a driven pulley connected with the wire,
   wherein the width adjustment unit further includes an intermediate pulley provided between the driving pulley and the driven pulley, and
   wherein the intermediate pulley includes:
   a first intermediate pulley for the wire connected with the driving pulley; and
   a second intermediate pulley for the wire connected with the driven pulley, the second intermediate pulley provided on the same axle with the first intermediate pulley.

3. A conveyor system having a width adjustment unit, comprising:
   a transfer unit for transferring goods;
   conveyor plates provided at both sides of the transfer unit, and guiding the goods by supporting both sides of the goods; and
   the width adjustment unit including a wire connected with the conveyor plates, a driving pulley operating the wire, and a driven pulley connected with the wire,
   wherein the wire is wound on the driving pulley and the driven pulley in an open belt driving method, an upper side of the wire provided at a side of the driving pulley from the intermediate pulley is connected with the conveyor plate, and a lower side of the wire provided at a side of the driven pulley is connected with the conveyor plate.

4. The conveyor system of claim 3, wherein the width adjustment unit further includes a tension control part provided on the middle of the wire, to maintain a tension.

5. The conveyor system of claim 3, wherein the width adjustment unit includes:
   a first tension control part provided on the wire of connecting the driving pulley with the intermediate pulley, to maintain the tension of wire; and
   a second tension control part provided on the wire of connecting the driven pulley with the intermediate pulley, to maintain the tension of wire.

6. The conveyor system of claim 5, wherein the first tension control part has one end connected with the conveyor plate provided at a side of the driving pulley, and the other end connected with an upper side of the wire to the intermediate pulley, and the second tension control part has one end connected with the conveyor plate provided at a side of the driven pulley, and the other end connected with a lower side of the wire to the intermediate pulley.

7. The conveyor system of claim 3, wherein the width adjustment unit further includes a guide part guiding and supporting a smooth operation of the conveyor plate.

8. A conveyor system having a width adjustment unit, comprising:
   a transfer unit for transferring goods;
   conveyor plates provided at both sides of the transfer unit, and guiding the goods by supporting both sides of the goods; and
   the width adjustment unit including a wire connected with the conveyor plates, a driving pulley operating the wire, and a driven pulley connected with the wire,
   wherein the width adjustment unit further includes a guide part guiding and supporting a smooth operation of the conveyor plate, and
   wherein the guide part includes:
   a bearing supporting a lower side of the conveyor plate; and
   a guide shaft supporting and guiding the bearing.

9. The conveyor system of claim 8, wherein the bearing is formed of resin or ceramic material, to minimize failure of operation generated by foreign matter or moisture.

10. The conveyor system of claim 7, wherein at least one guide part is provided in front or rear of the wire.

11. The conveyor system of claim 3, wherein the driving pulley is operated by a motor.

12. A conveyor system comprising:
a support being configured to support a liquid crystal panel; and
a width adjustment unit, the width adjustment unit being configured to adjust a width of the conveyor system according to a dimension of the liquid crystal panel;
a guide part guiding and supporting a smooth operation of the conveyor plate,
wherein the guide part includes:
a bearing supporting a lower side of the conveyor plate; and
a guide shaft supporting and guiding the bearing.

13. The conveyor system of claim 12, wherein the support comprises:
at least one rotating roller including a pair of supporting ends for supporting an underside of the liquid crystal panel where the supporting ends are arranged along one direction and spaced apart from each other by a width.

14. The conveyor system of claim 13, further comprising:
at least one motor for receiving data related to dimensions of the liquid crystal panel and for automatically adjusting the width.

15. The conveyor system of claim 12, wherein the width is automatically adjustable to correspond with edge areas of the liquid crystal panel.

16. The conveyor system of claim 15, wherein the edge areas of the liquid crystal panel include portions of the liquid crystal panel including a pad and a black matrix layer.

17. The conveyor system of claim 14, wherein the motor is a servo-motor.

18. The conveyor system of claim 14, wherein the motor adjusts the width by causing at least one of the supporting ends to be moved.

19. The conveyor system of claim 12, wherein the support comprises:
conveyor plates disposed at both sides of the conveyor system, the conveyor plates being configured to guide the liquid crystal panel by supporting both sides of the liquid crystal panel.

20. The conveyor system of claim 19, wherein the width adjustment unit comprises:
a wire connected with the conveyor plates;
a driving pulley configured to operate the wire; and
a driven pulley connected with the wire.

21. The conveyor system of claim 20, wherein the width adjustment unit further comprises:
an intermediate pulley provided between the driving pulley and the driven pulley.

22. A conveyor system comprising:
a support being configured to support a liquid crystal panel; and
a width adjustment unit, the width adjustment unit being configured to adjust a width of the conveyor system according to a dimension of the liquid crystal panel,
wherein the support comprises:
conveyor plates disposed at both sides of the conveyor system, the conveyor plates being configured to guide the liquid crystal panel by supporting both sides of the liquid crystal panel;
wherein the width adjustment unit comprises:
a wire connected with the conveyor plates,
a driving pulley configured to operate the wire, and
a driven pulley connected with the wire;
wherein the width adjustment unit further comprises:
an intermediate pulley provided between the driving pulley and the driven pulley; and
wherein the wire is wound about both the driving pulley and the driven pulley in an open belt driving method where an upper side of the wire disposed at the driving pulley from the intermediate pulley is connected with the conveyor plate and a lower side of the wire disposed at the driven pulley is connected with the conveyor plate.

23. A conveyor system comprising:
a support being configured to support a liquid crystal panel; and
a width adjustment unit, the width adjustment unit being configured to adjust a width of the conveyor system according to a dimension of the liquid crystal panel;
wherein the support comprises:
conveyor plates disposed at both sides of the conveyor system, the conveyor plates being configured to guide the liquid crystal panel by supporting both sides of the liquid crystal panel;
wherein the width adjustment unit comprises:
a wire connected with the conveyor plates,
a driving pulley configured to operate the wire, and
a driven pulley connected with the wire;
wherein the width adjustment unit further includes a guide part, the guide part being configured to guide and support a smooth operation of the conveyor plate; and
wherein the guide part comprises:
a bearing supporting a lower side of the conveyor plate; and
a guide shaft both supporting and guiding the bearing.

24. A conveyor system, comprising:
at least one rotating roller including a pair of supporting ends for supporting an underside of a liquid crystal display panel arranged along one direction and spaced apart from each other by a width; and
at least one numerically controlled motor for receiving data related to the dimensions of the liquid crystal panel and for automatically adjusting the distance between rollers based on the dimensions of the liquid crystal panel.

25. The conveyor system of claim 24, wherein the liquid crystal panel comprises:
an upper substrate;
a lower substrate bonded to the upper substrate; and
liquid crystal material arranged between the upper and lower substrates.

26. A conveyor system, comprising:
at least one rotating roller including a pair of supporting ends for supporting an underside of a liquid crystal display panel arranged along one direction and spaced apart from each other by a width; and
at least one numerically controlled motor for receiving data related to the dimensions of the liquid crystal panel and for automatically adjusting the width;
wherein the liquid crystal panel comprises:
an upper substrate,
a lower substrate bonded to the upper substrate, and
liquid crystal material arranged between the upper and lower substrates; and wherein the lower substrate comprises:
a plurality of gate lines arranged in fixed intervals along a first direction;
a plurality of data lines arranged in fixed intervals along a second direction, perpendicular to the first direction;
a plurality of pixel areas arranged at crossings of the plurality of gate lines and the plurality of data lines, the plurality of pixel areas including plurality of thin film transistors and pixel electrodes; and
gate pads and data pads formed at an edge of the lower substrate so as to be connected to the gate and data lines, respectively.

27. The conveyor system of claim 26, the upper substrate comprising:
a black matrix layer for preventing leakage of light outside the pixel areas;
a color filter layer; and
a common electrode for driving the liquid crystal panel.

28. The conveyor system of claim 27, wherein the width is automatically adjustable to correspond with edge areas of the liquid crystal panel.

29. The conveyor system of claim 28, wherein the edge areas of the liquid crystal panel include portions of the liquid crystal panel including a pad and black matrix layer.

30. The conveyor system of claim 24, wherein the motor is a servo-motor.

31. The conveyor system of claim 24, wherein the motor adjusts the width by causing at least one of the supporting ends to be moved.

32. A rotating roller, comprising:
more than one supporting end for contacting and supporting an underside of an object of predetermined width at a predetermined area; and
a numerically controlled motor for automatically adjusting a distance between the more than one supporting end based on the predetermined width of the object.

33. The rotating roller according to claim 32, wherein the object includes a liquid crystal display panel.

34. The rotating roller according to claim 32, wherein the predetermined area corresponds to an area where generation of static electricity in the object may be minimized.

35. The rotating roller according to claim 32, wherein the motor includes a servo-motor.

36. The rotating roller according to claim 32, wherein the object includes a liquid crystal panel.

37. The rotating roller according to claim 32, wherein the predetermined area includes a gate pad.

38. The rotating roller according to claim 32, wherein the predetermined area includes a data pad.

39. The rotating roller according to claim 32, wherein the predetermined area includes a black matrix layer.

40. The rotating roller according to claim 32, wherein the motor adjusts the distance by causing at least one of the supporting ends to be moved.

* * * * *